INVENTOR.
THOMAS H. LITTLE
BY Dallett Hoopes
ATTORNEY

July 21, 1964    T. H. LITTLE    3,141,774
ANIMAL FATTY TISSUE DEFATTING PROCESS
Filed Feb. 2, 1962    3 Sheets-Sheet 2

INVENTOR.
THOMAS H. LITTLE
BY Dallett Hoopes
ATTORNEY

July 21, 1964        T. H. LITTLE        3,141,774
ANIMAL FATTY TISSUE DEFATTING PROCESS
Filed Feb. 2, 1962        3 Sheets-Sheet 3
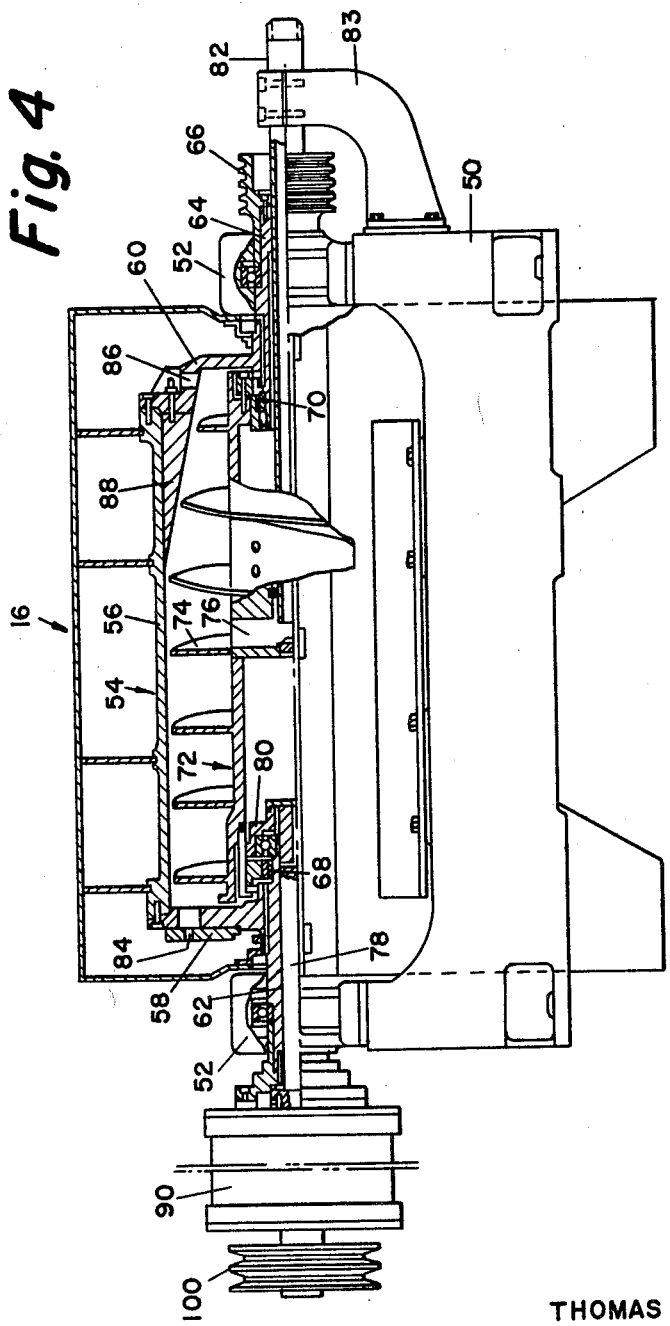
INVENTOR.
THOMAS H. LITTLE
BY Wallett Hoopes
ATTORNEY United States Patent Office 3,141,774
Patented July 21, 1964

3,141,774
ANIMAL FATTY TISSUE DEFATTING PROCESS
Thomas H. Little, Devon, Pa., assignor to Pennsalt Chemicals Corporation, a corporation of Pennsylvania
Filed Feb. 2, 1962, Ser. No. 170,588
8 Claims. (Cl. 99—18)

This invention relates to the defatting of animal fatty tissue by low temperature rendering and the production therefrom of tissue with reduced fat content and of separated fat with low protein content.

The prior art discloses a process for rendering animal fats in which the raw fatty tissue is ground to chunks, disintegrated or comminuted, and heated to fluidize the mass. The mass is then taken to a zone of separation in which the melted fat is separated from the protein tissue.

I have developed a process by which protein of lesser fat content than under comparable former processes is discharged from the separator. Consequently the yield of the separated fat is higher. The process of the invention may therefore be regarded as an improvement over the prior art processes described above.

I have found that considerable lowering of the fat content of the discharged protein solids may be achieved if the comminuting of the fat tissue is violently effected in a confined, steam-containing comminuting zone until the tissue is reduced to at least a selected particle size.

Other features of the invention will be apparent from the following specification and claims wherein:

FIGURE 4 is an elevation partly in section of a centrifuge suitable for use in a process embodying the invention.

Briefly, in the defatting of animal tissue the invention is the process which includes the steps of comminuting and agitating the tissue in the presence of steam, applying heat to the tissue to raise it to a temperature not above 212° F. and then separating the defatted tissue and the melted fat.

Figure 1:
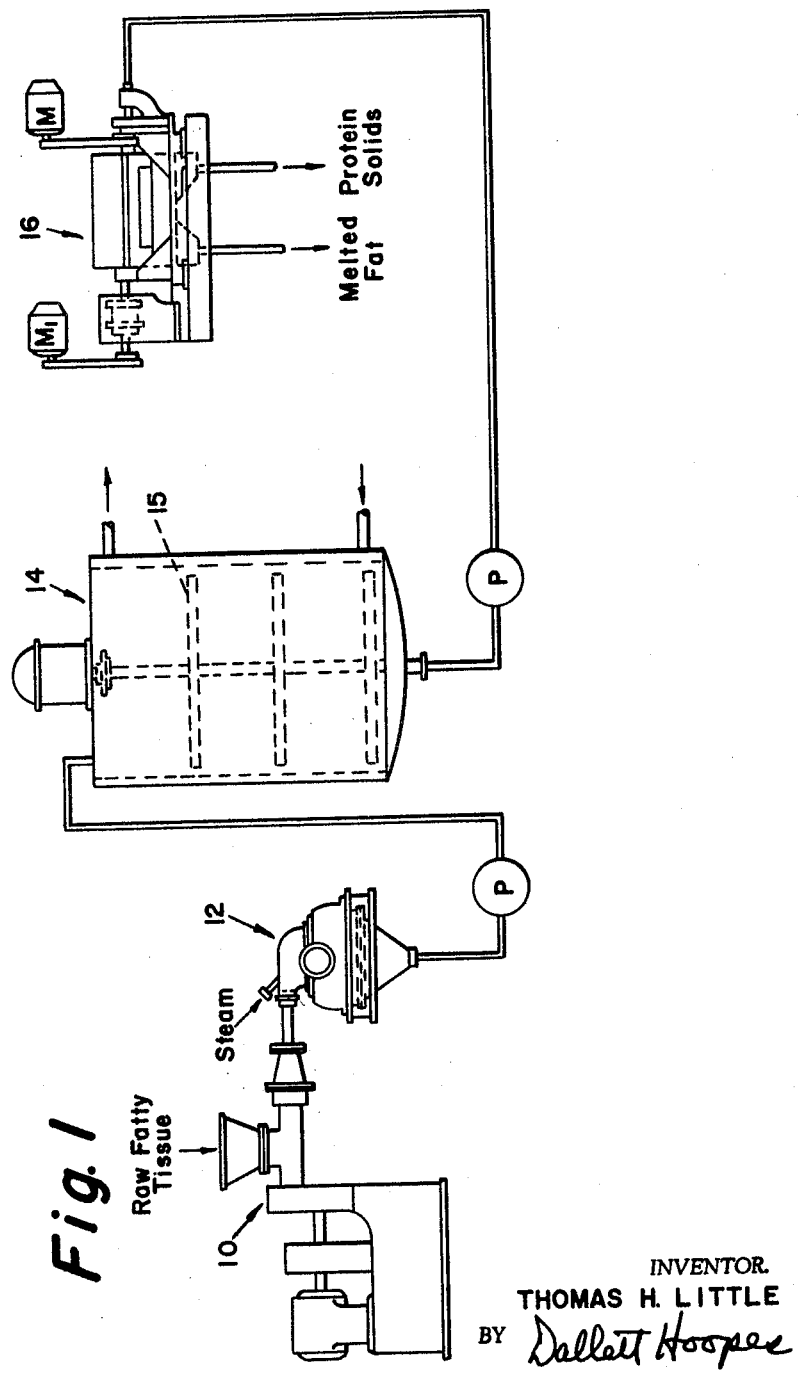
FIGURE 1 is a flow sheet diagrammatically illustrating the new process.

Referring more specifically to the drawings, a process embodying my invention is shown diagrammatically in FIGURE 1. It includes a convention grinder 10 having a hopper adapted to receive raw fatty tissue. The discharge of the grinder is attached to a comminutor 12 preferably containing a plurality of rotary elongate cutting surfaces which comminute the ground tissue down to a selected particle size before the tissue is discharged from the comminutor. The comminutor is provided with an appropriate inlet for the passage of steam into the comminuting chamber. As shown, the steam inlet is directed into the chamber at an angle which is non-radial and preferably in the direction of the rotation of the cutting surfaces.

The tissue after having been comminuted to a selected particle size is then conveyed by gravity or conveniently a pump to a heat tank 14 which may conventionally be in the form of a steam-jacketed kettle provided with a rotary agitator 15 adapted to stir the tissue and its melted fat, maintaining thermal equilibrium throughout the mass. In the heat tank the mass may be raised to a temperature not exceeding 212° F. and preferably in the range of 140° F. to 170° F. It will be noted that the heat tank 14 serves as a reservoir to provide a continuous supply of feed to the centrifuge 16. From the heat tank the mass is conveyed to the centrifuge 16. In the centrifuge the melted fat is separated from the protein solids and discharged separately.

Provided that the feed to the process contains no skin and is otherwise of edible material, the protein solids discharging from the centrifuge may be sold as edible tissue and usable for instance in cooked sausage products. The melted fat may be further processed, as desired or necessary, and sold as lard for cooking purposes.

Figure 2:
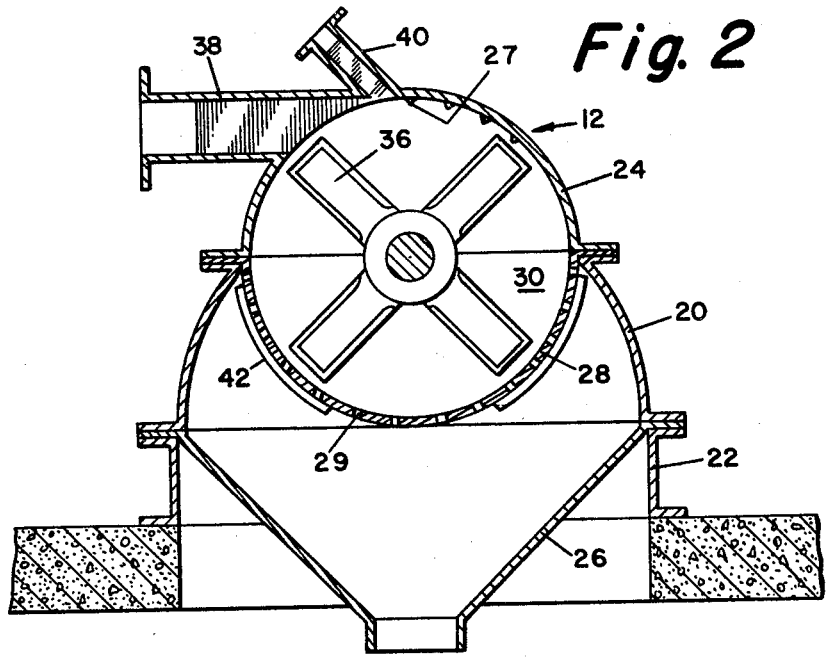
FIGURE 2 is a vertical section of a comminutor suitable for use with a process embodying the invention.

A comminutor suitable for use as comminutor 12 in a process embodying the invention is indicated generally at 12 in FIGURE 2. It comprises a housing 20 including a base 22, the removable cover 24 and the hopper 26. As shown at 27 the cover 24 may be provided with ridges to make more effective the comminution action. Supported by the housing 20 under the cover 24 is a curved screen or plate 28 having apertures 29 of the selected particle size. As shown, the cover 24 and plate 28 complement each other to define a chamber 30 constituting the zone of comminution.

Figure 3:
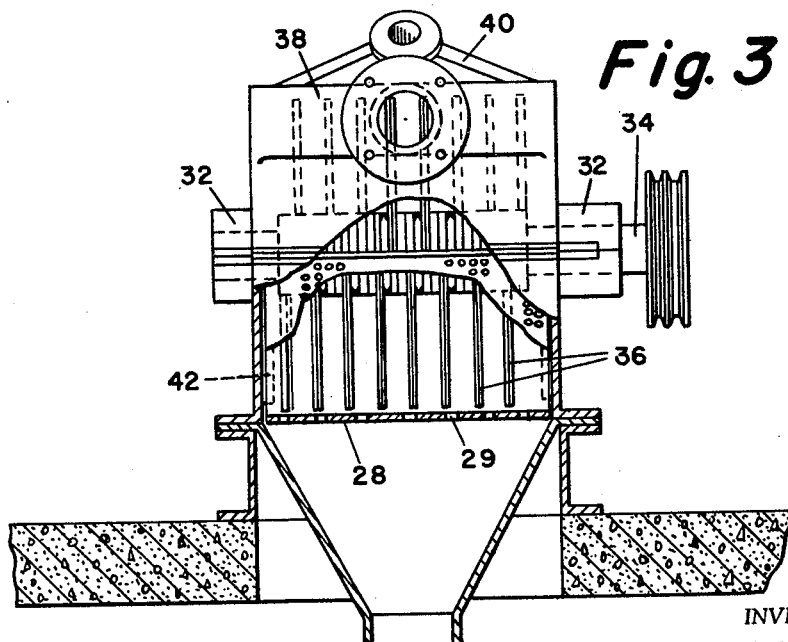
FIGURE 3 is a plan elevational view, partly in section of the apparatus of FIGURE 2.

As shown in FIGURE 3, bearings 32 at either side of the housing support for rotation a drive shaft 34 which mounts intermediate the bearings a plurality of radially disposed single comminuting blades 36. FIGURE 2 indicates that the blades 36 have a cutting surface on their leading edge and on their trailing edge for reversal after the leading edge wears. The blades are elongate, being substantially radial to the shaft 34. It will be noted that there is small clearance between the tips of the blades 36 and the inner periphery of the housing and plate 28.

An inlet pipe 38 is secured to the cover 24 and, as shown, directs the tissue generally tangentially to the rotary path of the blades 36. A second inlet duct 40 comprises the means for introducing steam into the comminution zone 30. As shown in FIGURE 2, the steam duct 40 directs steam substantially tangential to the path of the blades. FIGURE 3 indicates that the duct 40 flares outwardly into a flattened introductory mouth which is joined to the cover 24 to distribute the entering steam along a locus more or less coextensive with the blade portion of the shaft 34.

The plate 28, as shown in FIGURE 3, rests on semicircular ledges or tracks 42 in the side walls of the housing 20 and may readily be removed after removal of the cover 24 for cleaning purposes as desired or necessary.

As shown in FIGURE 3 the comminutor shaft 34 is preferably driven by pulleys which may be connected by belt means not shown to a suitable source of power, e.g., an electric motor.

A suitable centrifuge for performing the operation of centrifuge 16 is illustrated in FIGURE 4. As shown the machine comprises a frame 50 including a pair of spaced aligned bearing units 52. A rotor 54 comprises a peripheral wall 56 and a pair of spaced end walls 58 and 60 secured thereto. The end walls 58 and 60 are formed with outwardly extending coaxial shafts 62 and 64, respectively, each of which are formed with an axial opening. The shafts 62 and 64 are mounted to rotate within the bearing units 52 and the shaft 64 has a rightward extension as shown in FIGURE 4 terminating in a pulley assembly 66. As shown in FIGURE 1 a constant speed motor is connected thereto. The end walls 58 and 60 carry inwardly projecting stubs 68 and 70. Rotatably mounted between and on the stubs 68 and 70 is a conveyor element 72 having helical flights 74 and a feed opening 76 intermediate its ends. A drive shaft 78 extends axially within the opening of shaft 62, is adapted to rotate at a speed different from the speed of shaft 62, and is secured for unitary movement with a conveyor element 72 by being keyed to the conveyor hub element 80.

As shown in FIGURE 4, an axial feed tube 82 supported by a rightwardly extending arm 83 is adapted to lead a feed mixture to a central position of the apparatus wherefrom it is passed to the feed opening 76 into the rotor. Appropriate seals, not a part of this invention, are provided between the feed tube 82 and the conveyor element 72 to keep the feed from entering the various bearing units.

The leftward end wall as shown in FIGURE 4 is formed with a liquid discharge opening 84 spaced inwardly from the outermost inside surface of the peripheral wall 56. Similarly, the rightward end wall 60 is formed with a solids discharge opening 86, preferably as shown extending radially of the axis. The inward terminus of the opening 86 is disposed inwardly of the opening 84.

As shown, the conveyor element 72 has its flights reduced in radius toward the right end of the apparatus to conform to a frusto-conical shape, and a bowl filler 88 is provided to streamline the transition between the inside surface of the wall 56 and opening 86 in order that solids may be easily plowed toward the latter.

By means of the gear box 90 the rotational movement of the rotor 56 is imparted to the conveyor element 72. As described fully in the co-pending U.S. patent application Serial No. 138,304, filed September 15, 1961, in the U.S. Patent Office, by Thomas W. Alberts, the gear box 90 contains two stages of planetary gears, the sun gear of the first stage of which may be driven by suitable power means, which as shown in FIGURE 1 is conveniently a motor $M_1$ which may be variable, through the pulley 100. The second stage gear cage is attached to the shaft 78 which drives the conveyor element 72 within the rotor 54. It will be understood that while the speed of rotation of the rotor 54 will remain constant, the speed of rotation of the conveyor element 72 may be altered by varying the speed of the pulley 100.

In operation, the tissue and melted fat is introduced to the feed tube 82 into the conveyor 72 and out through the feed opening 76. Centrifugal force urges the protein solids against the wall of the rotor 54 to displace an inward layer of melted fat. The fat may discharge through the opening 84 in the hub 58 of the rotor while solids are plowed or scrolled toward the right hand side of the apparatus as shown in FIGURE 4 and may discharge outwardly through the solids discharge port 86.

The following examples are illustrative of the effectiveness of my development.

*Example I*

Sixty thousand pounds of mixed beef cutting and killing fats at 40° F. were introduced to a process as presented in FIGURE 1. The screen in the comminutor was formed with ¾" holes. The comminutor with 32 single meat type knives, each having a cutting surface, was rotated at 3600 r.p.m. Steam was injected into the comminuator as shown and the pressure in the comminutor was atmospheric. The amount of steam was regulated to give a 90° F. rise across the comminutor. The temperature of the mass was raised to 170° F. in the heat tank. The centrifugal apparatus was a Super-D-Canter centrifuge. From the centrifuge the discharged protein tissue comprising the solids discharge amounted to approximately 15% of the total charge of raw fat, or approximately 9000 pounds of tissue. The tissue analyzed at:

70% moisture
24% solids
6% fat

The throughput rate was 12,000 to 15,000 pounds per hour.

*Example II*

Alternatively, in operating the process outlined without the injection of steam in the comminutor and raising the temperature of a mass from the same source from approximately 40° F. to 170° F. partly by friction in the comminutor and partly in the heat tank, the protein discharge, which will amount to approximately 15% of the total charge, may be expected to analyze at:

65% moisture
23% solids
12% fat

Hence, by operating under the process of the invention, a reduction of 6% fat content of the discharge solids may be achieved. This fat removed from the tissue appears in the fat discharge from the centrifuge and may be further processed if desired or necessary.

The improved purity of the protein solids is obviously attributable to the presence of steam in the comminutor. The precise reason for the lowered fat content is not known. However, it is theorized that the infliction of the rotary blows of the elongate cutting surfaces on the tissue not only serves to reduce particle size by comminution, but also to mix the steam and the tissue so intimately that in the thorough contact of the steam and the tissue there is an extremely effective displacement of the melted fat on the tissue surfaces by the steam. I conclude that a preferential wetting by water of oil-covered surfaces is promoted under the circumstances of temperature and activity in the zone of comminution, e.g., comminutor 12, under the conditions disclosed.

Obviously, reasonable variations from the disclosed process are within the scope of one skilled in the art. For instance, it is contemplated that the comminutor may be sealed and maintained under pressure still retaining many of the benefits of the invention. Further, it is found that some or all of the cutting surfaces which effect comminution may be replaced by beating surfaces or hammers which will effect an intimate contact of the steam in the tissue to promote some beneficial result. The dual function of the cutting surface as a mixing implement and a comminuting device, however, makes the cutting surface embodiment preferred.

If desired for any reason the tissue may be prewarmed prior to the comminution, still maintaining many of the benefits of the invention.

It should be understood that it is much preferred to operate the process of the invention without the introduction of steam or water other than that introduced in the comminutor.

While it is possible to accomplish the heating of the tissuer entirely in the comminution zone by the steam present, and to feed directly therefrom to the centrifuge, it is preferred to heat additionally or at least hold the temperature in a tank as disclosed whereby temperature of the feed to the centrifuge may be adjusted as desired and whereby a steady source of feed to the centrifuge is assured.

It is to be understood that the above particular description is by way of illustration and that changes omissions, additions, substitutions and/or modifications may be made therein without departing from the spirit of the invention. Therefore, it is intended that the patent shall cover the various features of patentable novelty that reside in the invention.

I claim:

1. In the defatting of animal tissue to produce a relatively moist partially defatted tissure product the process which includes the steps of: striking the tissue violently and repeatedly with rotary blows of an elongate element in a confined comminuting zone in the presence of steam injected from an external source until the tissure is reduced to a selected particle size, applying heat to the tissure to raise the temperature of the particle mass to between about 140° F. and 170° F.; and then separating the tissure from the fat melted during the striking and heating step.

2. In the defatting of animal tissue to produce a relatively moist partially defatted tissue product the process which includes the steps of: grinding the tissue; striking the tissue violently and repeatedly with rotary blows of an elongate cutting surface in a confined comminuting zone until the tissue is reduced to at least about ¾" particle size; injecting steam from an external source into the comminuting zone during the striking; applying heat to the tissue in the absence of additional water to raise the temperature of the particle mass to between about 140° F. and 170° F.; and then in a zone of centrifugal force separating the tissue from the fat melted during the striking and heating steps.

3. In the defatting of animal tissue to produce a relatively moist partially defatted product the process which includes the steps of: grinding the tissue, striking the tissue violently and repeatedly with rotary blows of radially disposed axially spaced elongated cutting surfaces in a confined comminuting zone until the tissue is reduced to at least about ¾" particle size; injecting steam from an external source into the comminuting zone during the striking; applying heat to the tissue in the absence of additional water to raise the temperature of the particle mass to between about 140° F. and 170° F.; then introducing the tissue and fat melted during the striking and heating steps to a zone of centrifugal force, moving the solids in the zone toward one end of the zone and discharging them from the zone at the end, and separately discharging the melted fat from the other end of the zone.

4. In the defatting of animal tissue to produce a relatively moist partially defatted tissue product the process which includes the steps of: comminuting and violently agitating the tissue in a confined comminuting zone in the presence of steam injected from an external source; then applying further heat to the tissue to raise its temperature throughout avoiding temperatures in excess of 212° F.; and then separating the melted fat from the remaining mass.

5. In a process for producing a relatively moist partially defatted proteinaceous tissue product including the steps of grinding the proteinaceous tissue, striking the tissue violently and repeatedly with rotary blows of an elongate comminuting surface in a confined comminuting zone until the tissue is reduced to at least three-quarter inch particle size, heating the tissue to raise the temperature of the particle mass to not in excess of 212° F. and then in a zone of centrifugal force separating the tissue from fat melted during the striking and heating, the improvement which comprises injecting steam from an external source into said comminuting zone whereby the steam is intimately mixed with the tissue to accomplish at least part of the heating and to cause the tissue product to issue from the process with a reduced fat content.

6. A process as described in claim 5 wherein the comminuting zone is maintained at substantially atmospheric pressure.

7. A process as described in claim 5 wherein the temperature of the particle mass does not exceed a temperature between 140° F. and 170° F. during the process.

8. A process as described in claim 5 wherein the steam is injected into the comminuting zone in the same direction as the rotary direction of the rotary blows.

References Cited in the file of this patent

UNITED STATES PATENTS

| | | |
|---|---|---|
| 1,821,639 | Hiller | Sept. 1, 1931 |
| 2,742,488 | Dufault | Apr. 17, 1956 |
| 2,823,215 | Downing | Feb. 11, 1958 |